US011619134B2

(12) United States Patent
Wakashima et al.

(10) Patent No.: US 11,619,134 B2
(45) Date of Patent: Apr. 4, 2023

(54) MIXED-FLOW TURBINE WHEEL

(71) Applicant: MITSUBISHI HEAVY INDUSTRIES ENGINE & TURBOCHARGER, LTD., Sagamihara (JP)

(72) Inventors: Koji Wakashima, Tokyo (JP); Makoto Ozaki, Tokyo (JP); Kimio Hatano, Tokyo (JP); Bumpei Hashimoto, Tokyo (JP); Hiroshi Saito, Tokyo (JP); Takuya Rikimaru, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 577 days.

(21) Appl. No.: 16/326,626

(22) PCT Filed: Aug. 22, 2016

(86) PCT No.: PCT/JP2016/074339
§ 371 (c)(1),
(2) Date: Feb. 19, 2019

(87) PCT Pub. No.: WO2018/037441
PCT Pub. Date: Mar. 1, 2018

(65) Prior Publication Data
US 2020/0378260 A1 Dec. 3, 2020

(51) Int. Cl.
*F01D 5/02* (2006.01)
*F01D 5/04* (2006.01)
(Continued)

(52) U.S. Cl.
CPC .............. *F01D 5/027* (2013.01); *F01D 5/043* (2013.01); *G01M 1/16* (2013.01); *G01M 1/26* (2013.01);
(Continued)

(58) Field of Classification Search
CPC ........ F01D 5/027; F01D 5/043; F04D 29/662; F05D 2270/80; G01M 1/16; G01M 1/26; G01M 1/28
See application file for complete search history.

(56) References Cited

U.S. PATENT DOCUMENTS

| 4,864,859 A | 9/1989 | Jensen |
| 9,181,804 B1 | 11/2015 | Kennedy |

(Continued)

FOREIGN PATENT DOCUMENTS

| JP | 57-200831 A | 12/1982 |
| JP | 3-503315 A | 7/1991 |

(Continued)

OTHER PUBLICATIONS

European Office Action, dated Mar. 16, 2020, for European Application No. 16914116.5.
(Continued)

*Primary Examiner* — Christopher R Legendre
(74) *Attorney, Agent, or Firm* — Birch, Stewart, Kolasch & Birch, LLP

(57) ABSTRACT

A mixed-flow turbine wheel includes: a plurality of rotor blades disposed on a circumferential surface of the hub at intervals in a circumferential direction and configured such that each of the plurality of rotor blades has a leading edge which includes, in a meridional view, an oblique edge portion where a distance between the leading edge and an axis of the rotational shaft decreases from a tip side toward a hub side, and a sensor detection surface having a flat shape and being applied with a marking which is detectable by an optical sensor device. The sensor detection surface is formed on at least one of the circumferential surface of the hub or an edge portion of a reference rotor blade being one of the plurality of rotor blades, such that, in the meridional view, a trailing-edge side angle of two angles formed between the
(Continued)

axis of the rotational shaft and a normal of the sensor detection surface is smaller than a trailing-edge side angle of two angles formed between the axis of the rotational shaft and a normal of the oblique edge portion.

6 Claims, 9 Drawing Sheets

(51) Int. Cl.
G01M 1/26 (2006.01)
G01M 1/28 (2006.01)
G01M 1/16 (2006.01)

(52) U.S. Cl.
CPC ........... *G01M 1/28* (2013.01); *F05D 2220/40* (2013.01); *F05D 2240/50* (2013.01); *F05D 2240/60* (2013.01); *F05D 2260/96* (2013.01); *F05D 2270/80* (2013.01)

(56) References Cited

U.S. PATENT DOCUMENTS

| | | | |
|---|---|---|---|
| 2009/0183556 A1 | 7/2009 | Shimizu et al. | |
| 2009/0290980 A1 | 11/2009 | Higashimori | |
| 2015/0361993 A1 | 12/2015 | An et al. | |
| 2020/0378260 A1* | 12/2020 | Wakashima | G01M 1/26 |

FOREIGN PATENT DOCUMENTS

| | | | |
|---|---|---|---|
| JP | 04315936 A | * | 11/1992 |
| JP | 10-299501 A | | 11/1998 |
| JP | 2003-302304 A | | 10/2003 |
| JP | 2007-183203 A | | 7/2007 |
| JP | 2009-281197 A | | 12/2009 |
| JP | 2011-21889 A | | 2/2011 |
| JP | 2012-112676 A | | 6/2012 |
| JP | 5588085 B1 | | 9/2014 |
| WO | WO 2015/119828 A1 | | 8/2015 |

OTHER PUBLICATIONS

Japanese Office Action, dated Mar. 10, 2020, for Japanese Application No. 2018-535928, with an English translation.
International Preliminary Report on Patentability and Written Opinion of the International Searching Authority (forms PCT/IB/373, PCT/ISA/237 and PCT/IB/338), dated Mar. 7, 2019, for International Application No. PCT/JP2016/074339, with a Written Opinion translation.
International Search Report (form PCT/ISA/210), date Oct. 11, 2016, for International Application No. PCT/JP2016/074339, with an English translation.
Office Action dated Oct. 8, 2019 issued to the corresponaig Japanese Patent Application 2018-535928.
Extended European Search Report dated Jul. 22, 2019 issued in the corresponding European Application No. 16914116.5.

\* cited by examiner

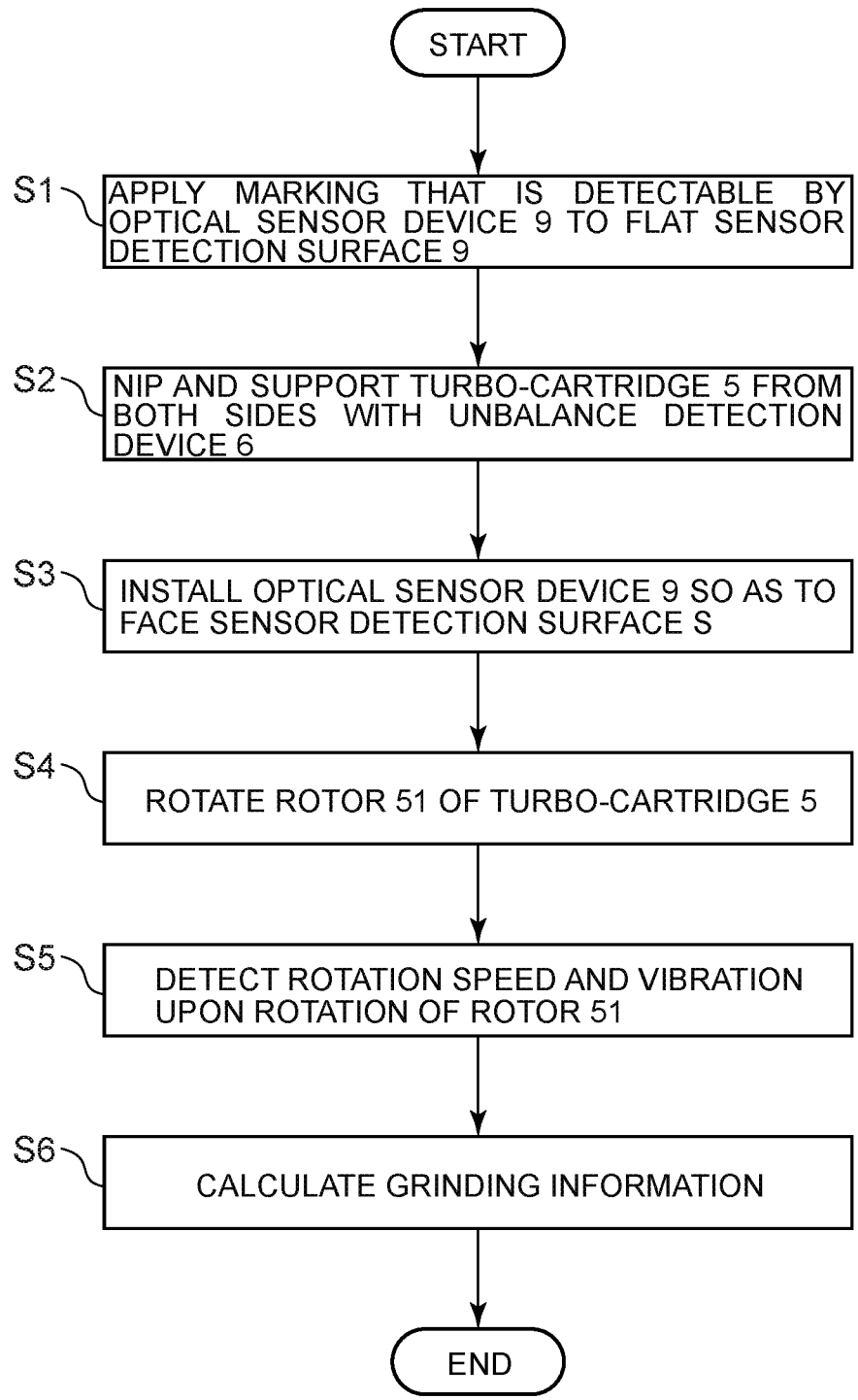

MIXED-FLOW TURBINE WHEEL

TECHNICAL FIELD

The present disclosure relates to a mixed-flow turbine wheel.

BACKGROUND ART

Requirements for improvement of fuel consumption and exhaust gas of engines have been increasing these years, and in return engines are downsized using turbochargers. A turbocharger includes a cartridge (hereinafter, turbo-cartridge) including a rotor joining a turbine wheel and a compressor wheel via a rotational shaft, and a bearing housing accommodating a bearing that supports the rotor rotatably, as its core components. The above turbine wheel includes, for instance, a radial turbine wheel into which gas flows in the radial direction, and a mixed-flow turbine wheel into which gas flows in a diagonal direction. Further, when the engine is in operation, as the turbine wheel disposed in the exhaust passage of the engine is rotary driven by exhaust gas, the compressor wheel disposed in the intake passage of the engine is also rotary driven, and thereby intake air of the engine is supercharged. As the rotor of the turbo-cartridge rotates at a high speed during operation of the engine, unbalance correction work is performed on the rotor during its production, so as to prevent vibration upon rotation, noise accompanying vibration, and breakage due to unbalance of the rotor.

The above unbalance correction work is normally performed for each constituent member of the rotor such as a compressor wheel and a turbine wheel, and each of the rotary member made up of the constituent members, in order. More specifically, in the unbalance correction work, the work target such as a constituent member and the rotor is actually rotated to detect its unbalance. Further, when unbalance is detected, the balance is adjusted by grinding the work target, for instance (see FIGS. 1 to 3, for instance). For instance, for the rotor, the unbalance detection device supports the turbo-cartridge while each of the two wheels is covered with a housing member (jig). In this state, air is supplied to the compressor wheel or the like to rotate the rotor. At this time, vibration upon rotation due to unbalance of the rotor is detected with a vibration sensor, and the rotation speed of the rotor (phase of rotation) is detected at the same time. Further, on the basis of the relationship between vibration and phase upon rotation of the rotor, the phase of the rotor that is causing the vibration is specified. Then, the rotor is ground for balancing, where the relationship between the mass to be ground and a change in the magnitude of vibration accompanying the grinding is obtained in advance through experiments by using a turbo-cartridge of the same model (production). Further, on the basis of the above vibration signal, phase, and effect vector (experiment result), grinding information that includes the optimum mass and the grinding position for balancing of the rotor is calculated, and the rotor is ground on the basis of the grinding information.

As described above, in unbalance correction works, it is necessary to detect the rotation speed of the work target object upon rotation. For instance, Patent Document 1 discloses detecting the sensor detection surface of the work target object by using a reflection-type optical sensor device. More specifically, the above sensor detection surface is disposed obliquely with respect to the side surface of the tip portion of the boss portion or the side surface of the back plate portion of the compressor wheel. Further, the optical sensor device detects the rotation speed (phase) by detecting reflection of light emitted by the optical sensor device and reflected by the sensor detection surface. The optical sensor device detects reflection light when the sensor detection surface of the rotating compressor wheel passes the front of the optical sensor device (faces the optical sensor device).

Further, in Patent Documents 2 and 3, in the unbalance correction work of the turbo-cartridge, an angular sensor (rotation detector) is disposed in the vicinity of the compressor wheel or the turbine wheel on the axis of the rotational shaft. In particular, the turbine of Patent Document 2 is a mixed-flow turbine, and the angle sensor is disposed on the tip side of the rotational portion of the compressor.

CITATION LIST

Patent Literature

Patent Document 1: JP5588085B
Patent Document 2: JP2011-21889A
Patent Document 3: JP2007-183203A

SUMMARY

Problems to be Solved

Meanwhile, the portion to be ground to correct unbalance of a rotor or a wheel constituting the rotor is normally the boss portion or the back surface of the wheel. For instance, as in Patent Documents 2 and 3, when the angle sensor is disposed in the vicinity of the tip of the wheel on the axis of the rotational shaft, the angle sensor needs to be moved so as not to interfere with the tool when grinding the boss portion of the rotor (see Patent Document 2).

Further, in a case where a portion for detecting rotation with the angle sensor and a portion to be ground for unbalance correction are the same, the shape of the portion for detecting rotation by using the angle sensor gets changed, which may prevent accurate detection of the rotation angle by the angle sensor. In this regard, Patent Document 1 is advantageous in that the sensor detection surface is formed by machine-processing the side surface of the tip portion of the boss portion or the side surface of the back plate portion of the compressor wheel, and thus it is possible to avoid grinding the sensor detection surface for unbalance correction. However, applying the method of Patent Document 1 would lead to an increase in the production costs, for a turbine wheel is formed of a harder a than the compressor wheel and cannot be machine-processed to form the sensor detection surface as easily.

Thus, in the case of a radial turbine, in a meridional view, a marking (grinding or paint coating, for instance) may be applied to a leading edge of a rotor blade formed parallel to the axis of the rotational shaft to form the sensor detection surface, and the optical sensor device may be disposed along the radial direction of the rotational shaft so as to be capable of facing the sensor detection surface. A leading edge of a rotor blade of a radial turbine is a portion where it is possible to ensure a size that can be detected by the optical sensor device, and is formed parallel to the axis of the rotational shaft in a meridional view, which makes it relatively easy to install the optical sensor device. However, in a mixed-flow turbine wheel, a leading edge of a rotor blade is not formed parallel to the axis of the rotational shaft, but is oblique toward the center side of the rotational shaft. Furthermore, the optical sensor device needs to be placed so as to be capable of facing the sensor detection surface being oblique toward the center side of the rotational shaft, while being in the vicinity of the sensor detection surface. Thus, in a case where the sensor detection surface is formed on the leading edge of the rotor blade of a mixed-flow turbine wheel, the optical sensor device is positioned closer toward the center side of the rotational shaft from the leading edge. However, the bearing housing of the turbo-cartridge or the unbalance detection device exists in a position where the optical sensor device is to be installed, and thus it is difficult to provide the optical sensor device. Furthermore, the smaller the turbine wheel is, the more difficult it is to ensure a portion that can be utilized as the sensor detection surface as it is, such as the leading edge of the rotor blade.

In view of the above issue, an object of at least one embodiment of the present invention is to provide a mixed-flow turbine wheel including a sensor detection surface capable of facing an optical sensor device whereby it is possible to detect rotation of the rotor without interfering with other parts, in unbalance correction works.

Solution to the Problems (1) According to at least one embodiment of the present invention, a mixed-flow turbine wheel includes: a hub fixed to a rotational shaft; a plurality of rotor blades disposed on a circumferential surface of the hub at intervals in a circumferential direction and configured such that each of the plurality of rotor blades has a leading edge which includes, in a meridional view, an oblique edge portion where a distance between the leading edge and an axis of the rotational shaft decreases from a tip side toward a hub side; and a sensor detection surface having a flat shape and being applied with a marking which is detectable by an optical sensor device. The sensor detection surface is formed on at least one of the circumferential surface of the hub or an edge portion of a reference rotor blade being one of the plurality of rotor blades, such that, in the meridional view, a trailing-edge side angle of two angles formed between the axis of the rotational shaft and a normal of the sensor detection surface is smaller than a trailing-edge side angle of two angles formed between the axis of the rotational shaft and a normal of the oblique edge portion.

With the above configuration (1), the normal of the sensor detection surface extends toward the trailing edge side (tip side of the hub) in the axial direction of the rotational shaft relatively compared to the normal of the oblique edge portion. That is, it is possible to install the optical sensor device in a position relatively remote from the center side of the rotational shaft. Thus, in the unbalance correction work of each of the mixed-flow turbine wheel and the turbo-cartridge including the mixed-flow turbine wheel using the unbalance detection device, it is possible to install the optical sensor device for detecting the rotational position of the mixed-flow turbine wheel so as to be capable of facing the sensor detection surface of the mixed-flow turbine wheel without physically interfering with the unbalance detection device or the bearing housing of the turbo-cartridge. Accordingly, it is possible to provide the mixed-flow turbine wheel including the sensor detection surface which enables appropriate acquisition of information required for the unbalance correction work, such as the rotation speed (rotation phase) of the mixed-flow turbine wheel.

(2) In some embodiments, in the above configuration (1), the leading edge of the reference rotor blade includes, in the meridional view, a first parallel edge portion connecting to the oblique edge portion and extending in a direction parallel to the axis of the rotational shaft, and the sensor detection surface is formed on the first parallel edge portion.

With the above configuration (2), the sensor detection surface is formed by forming the shape of the end portion side (hub-side end or tip-side end described below) of the leading edge of a reference rotor blade to be parallel to the axis of the rotational shaft, and by utilizing the thickness of the first parallel edge portion. The mixed-flow turbine wheel is formed of a hard material to withstand exposure to high-temperature exhaust gas, and is difficult to machine-process compared to the compressor wheel. Meanwhile, in the mixed-flow turbine wheel of the present invention, the leading edge of the reference rotor blade is formed so as to have the first parallel edge portion. Thus, machine-processing for forming the sensor detection surface, such as grinding the circumferential surface of the hub, is unnecessary, and thus the sensor detection surface can be also formed on a small mixed-flow turbine wheel. Furthermore, by forming the first parallel edge portion on the end portion side of the leading edge of the reference rotor blade, it is possible to reduce the extent of shape change to a typical mixed-flow turbine wheel not having the first parallel edge portion. Thus, it is possible to form the sensor detection surface easily while suppressing the influence of the first parallel edge portion on the performance of the turbocharger.

Further, for instance, in a case where the sensor detection surface is to be formed on the leading edge in a radial turbine wheel where the leading edge of the rotor blade is parallel to the axis of the rotational shaft, the optical sensor device can be installed similarly to the sensor detection surface formed on the first parallel edge portion of the mixed-flow turbine wheel of the present invention. That is, common equipment of the unbalance detection device for unbalance correction can be used for different kinds of turbine wheels, and it is possible to reduce the production costs.

(3) In some embodiments, in the above configuration (2), in the meridional view, the first parallel edge portion on the leading edge of the reference rotor blade is formed on a position including a hub-side end of the leading edge.

With the above configuration (3), by forming the first parallel edge portion on an end (the hub-side end) of the leading edge of the reference rotor blade, it is possible to form the sensor detection surface easily while suppressing the influence of the first parallel edge portion on the performance of the turbocharger. That is, the distance between the hub-side end of the leading edge and the rotational shaft is shorter than the distance between the rotational shaft and the tip-side end of the leading edge. Thus, the influence on the torque of the rotational shaft is smaller at the hub-side end of the leading edge than at the tip-side end of the leading edge. Furthermore, the first parallel edge portion formed on a position including the hub-side end is at the end of the main flow of exhaust gas supplied from the scroll part (not depicted) of the turbine, where a smaller amount of exhaust gas flows than at the oblique edge portion of the leading edge. That is, in a case where the first parallel edge portion is formed on a position including the hub-side end, the first parallel edge portion can be formed so as to be out of the position (flow path) where the flow of exhaust gas exists.

Thus, the influence of shape change of the leading edge due to formation of the first parallel edge portion on the performance of the turbocharger is smaller at the hub-side end of the leading edge than at the tip-side end of the leading edge. Thus, by providing the first parallel edge portion on the hub-side end of the leading edge, it is possible to suppress influence on the performance of the turbocharger compared to a case where the first parallel edge portion is disposed on the tip-side end of the leading edge. Furthermore, the hub has a back plate portion forming the back surface of the hub, and for instance, in a case where the sensor detection surface is formed by utilizing the first parallel edge portion and the side surface (thickness) of the back plate portion, it is possible to further reduce the extent of shape change on the hub-side end of the reference rotor blade, and thus it is possible to further reduce the influence of the first parallel edge portion on the performance of the turbocharger.

(4) In some embodiments, in the above configuration (3), in the meridional view, the oblique edge portion on the leading edge of the reference rotor blade is formed to have a linear shape.

With the above configuration (4), by forming the first parallel edge portion on the end on the hub side (the hub-side end) of the leading edge of the reference rotor blade having an oblique edge portion formed to have a linear shape, it is possible to form the sensor detection surface easily while suppressing the influence of the first parallel edge portion on the performance of the turbocharger. That is, the obtuse angle formed between the axis of the rotational shaft and the tangent to the closest end, to the hub-side end, of the oblique edge portion formed to have a linear shape is greater than the obtuse angle formed between the axis of the rotational shaft and the tangent to the closest end, to the hub-side end, of the oblique edge portion formed to have a linear shape. This means that, at the closest end of the oblique edge portion to the hub-side end, an oblique edge portion having a linear shape can connect more gradually to the first parallel edge portion than an oblique edge portion having an arc shape. In other words, for the reference rotor blade having the oblique edge portion formed to have a linear shape, by forming the first parallel edge portion on the hub-side end of the leading edge of the reference rotor blade, it is possible to reduce the shape change amount due to the first parallel edge portion.

(5) In some embodiments, in the above configuration (2), in the meridional view, the first parallel edge portion on the leading edge of the reference rotor blade is formed on a position including a tip-side end of the leading edge.

With the above configuration (5), with the first parallel edge portion being formed on the end of the tip side (tip-side end) of the leading edge of the reference rotor blade, the sensor detection surface formed on the first parallel edge portion is formed on a position remote from the rotational shaft compared to a case where the first parallel edge portion is formed on the end of the hub side (hub-side end). Herein, the optical sensor device is supported on a position away from the rotational shaft by the unbalance detection device, around the turbo-cartridge. At this time, with the first parallel edge portion being formed on the tip-side end of the leading edge of the reference rotor blade, the optical sensor device can be installed to a position closer to the support position of the optical sensor device without extending from the support position toward the vicinity of the rotational shaft, and thus it is possible to install the optical sensor device more stably and easily.

(6) In some embodiments, in the above configuration (5), in the meridional view, the oblique edge portion on the leading edge of the reference rotor blade is formed to have an arc shape which protrudes toward a line connecting a hub-side end and the tip-side end of the leading edge.

With the above configuration (6), by forming the first parallel edge portion on the end on the tip side (the tip-side end) of the leading edge of the reference rotor blade having an oblique edge portion formed to have an arc shape, it is possible to form the sensor detection surface easily while suppressing the influence of the first parallel edge portion on the performance of the turbocharger. That is, the tip-side end of the leading edge having the above oblique edge portion having an arc shape is a position that becomes more parallel to the axis of the rotational shaft towards the tip-side end. Thus, by forming the first parallel edge portion on the tip-side end instead of the hub-side end of the oblique edge portion having an arc shape, it is possible to minimize the shape change amount of the shape of the leading edge that has a great influence on the performance.

(7) In some embodiments, in any one of the above configurations (2) to (6), La/L is ⅓ or smaller, when defining L as a length of the leading edge of the reference rotor blade in a direction along the axis of the rotational shaft and La as a length of the first parallel edge portion in the direction along the axis of the rotational shaft.

With the above configuration (7), it is possible to increase the flexibility of installment of the optical sensor device while suppressing the influence of the first parallel edge portion on the performance of the turbocharger.

(8) In some embodiments, in the above configuration (1), the reference rotor blade has a trailing edge which includes, in the meridional view, a second parallel edge portion formed to have a linear shape, and the sensor detection surface is formed on the second parallel edge portion.

With the above configuration (8), the sensor detection surface is formed by forming the shape of at least a part of the trailing edge of the reference rotor blade to have a linear shape (second parallel edge portion), and by utilizing the thickness of the second parallel edge portion. In this way, similarly to the above (2), it is possible to form the sensor detection surface easily while suppressing the influence of the first parallel edge portion on the performance of the turbocharger. Furthermore, it is possible to reduce the production cost.

(9) In some embodiments, in the above configuration (1), the reference rotor blade has a shroud-side edge portion which includes, in the meridional view, a third parallel edge portion connecting to a trailing edge of the reference rotor blade and extending in a direction parallel to the axis of the rotational shaft, and the sensor detection surface is formed on the third parallel edge portion.

With the above configuration (9), the sensor detection surface is formed by forming the shape of the portion of the shroud-side edge portion of the reference rotor blade connected to the trailing edge to be parallel to the axis of the rotational shaft (the third parallel edge portion), and by utilizing the thickness of the third parallel edge portion. In particular, the shroud-side edge portion of the reference rotor blade is a portion that becomes more parallel to the axis of the rotational shaft toward the trailing edge from the leading edge, and thus the extent of shape change to a mixed-flow turbine wheel without the third parallel edge portion is small. Thus, similarly to the above (2), it is possible to form the sensor detection surface easily while suppressing the influence of the third parallel edge portion on the performance of the turbocharger. Furthermore, it is possible to reduce the production cost.

(10) In some embodiments, in the above configuration (1), the circumferential surface of the hub is formed to include: a boss region formed along the circumferential direction by a boss portion disposed on a distal end of the hub; a rotor-blade region formed along the circumferential direction, where the plurality of rotor blades are disposed; and an intermediate region disposed between the boss region and the rotor-blade region. The sensor detection surface includes a flat surface formed in the intermediate region.

With the above configuration (10), the sensor detection surface is formed by forming a flat surface partially in the intermediate region between the rotor-blade region and the boss region on the circumferential surface of the hub. Normally, the optical sensor device needs to be positioned close to the sensor detection surface so that the distance to the sensor detection surface is a few millimeters (1 to 2 mm). By forming the sensor detection surface in the intermediate region, it is possible to install the optical sensor device while avoiding physical interference with the rotor blade that rotates along with rotation of the rotational shaft.

(11) In some embodiments, in any one of the above configurations (1) to (10), the sensor detection surface applied with the marking has a refractive index which is different from a refractive index of the circumferential surface of the hub or the edge portion of the reference rotor blade other than the sensor detection surface.

With the above configuration (11), it is possible to detect the sensor detection surface S formed on the mixed-flow turbine wheel by using the optical sensor device.

(12) In some embodiments, in any one of the above configurations (1) to (11), the mixed-flow turbine wheel further includes an unbalance correction portion including a cut-out portion formed on at least one of a back surface of the hub or a boss portion of the hub.

With the above configuration (12), the unbalance correction portion is the back surface or the boss portion of the hub. That is, as described above, the sensor detection surface of the present invention is formed on the circumferential surface of the hub or the edge portion of the reference rotor blade, and thereby it is possible to prevent the sensor detection surface from being ground due to the unbalance correction work.

(13) According to at least one embodiment of the present invention, a turbo cartridge includes: a rotor connecting the mixed-flow turbine wheel according to any one of (1) to (12) and a compressor wheel via a rotational shaft; and a bearing housing accommodating a bearing which supports the rotor rotatably.

With the above configuration (13), it is possible to provide a turbo-cartridge including a mixed-flow turbine wheel that has the same effect as the above (1).

(14) According to at least one embodiment of the present invention, a method of correcting unbalance of a mixed-flow turbine wheel is for a mixed-flow turbine wheel which includes: a hub fixed to a rotational shaft; a plurality of rotor blades disposed on a circumferential surface of the hub at intervals in a circumferential direction and configured such that a leading edge of each of the plurality of rotor blades includes an oblique edge portion, in a meridional view, where a distance between the leading edge and an axis of the rotational shaft decreases from a tip side toward a hub side; and a sensor detection surface having a flat shape. The sensor detection surface is formed on at least one of the circumferential surface of the hub or an edge portion of a reference rotor blade being one of the plurality of rotor blades, such that, in the meridional view, a trailing-edge side angle of two angles formed between the axis of the rotational shaft and a normal of the sensor detection surface is smaller than a trailing-edge side angle of two angles formed between the axis of the rotational shaft and a normal of the oblique edge portion. The method includes: a marking step of applying a marking which is detectable by an optical sensor device to the sensor detection surface having a flat shape; and a sensor installment step of installing the optical sensor device so as to be capable of facing the sensor detection surface having a flat shape and being applied with the marking.

With the above configuration (14), it is possible to provide an unbalance detection method that has the same effect as the above (1).

(15) In some embodiments, in the above configuration (14), the sensor detection surface applied with the marking has a refractive index which is different from a refractive index of the circumferential surface of the hub or the edge portion of the reference rotor blade other than the sensor detection surface.

With the above configuration (15), it is possible to provide an unbalance detection method that has the same effect as the above (11).

Advantageous Effects

According to at least one embodiment of the present invention, it is possible to provide a mixed-flow turbine wheel including a sensor detection surface capable of facing an optical sensor device whereby it is possible to detect rotation of the rotor without interfering other parts, in unbalance correction works.

BRIEF DESCRIPTION OF DRAWINGS

FIG. 9 is a flowchart showing an unbalance correction method for a mixed-flow turbine wheel according to an embodiment of the present invention.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
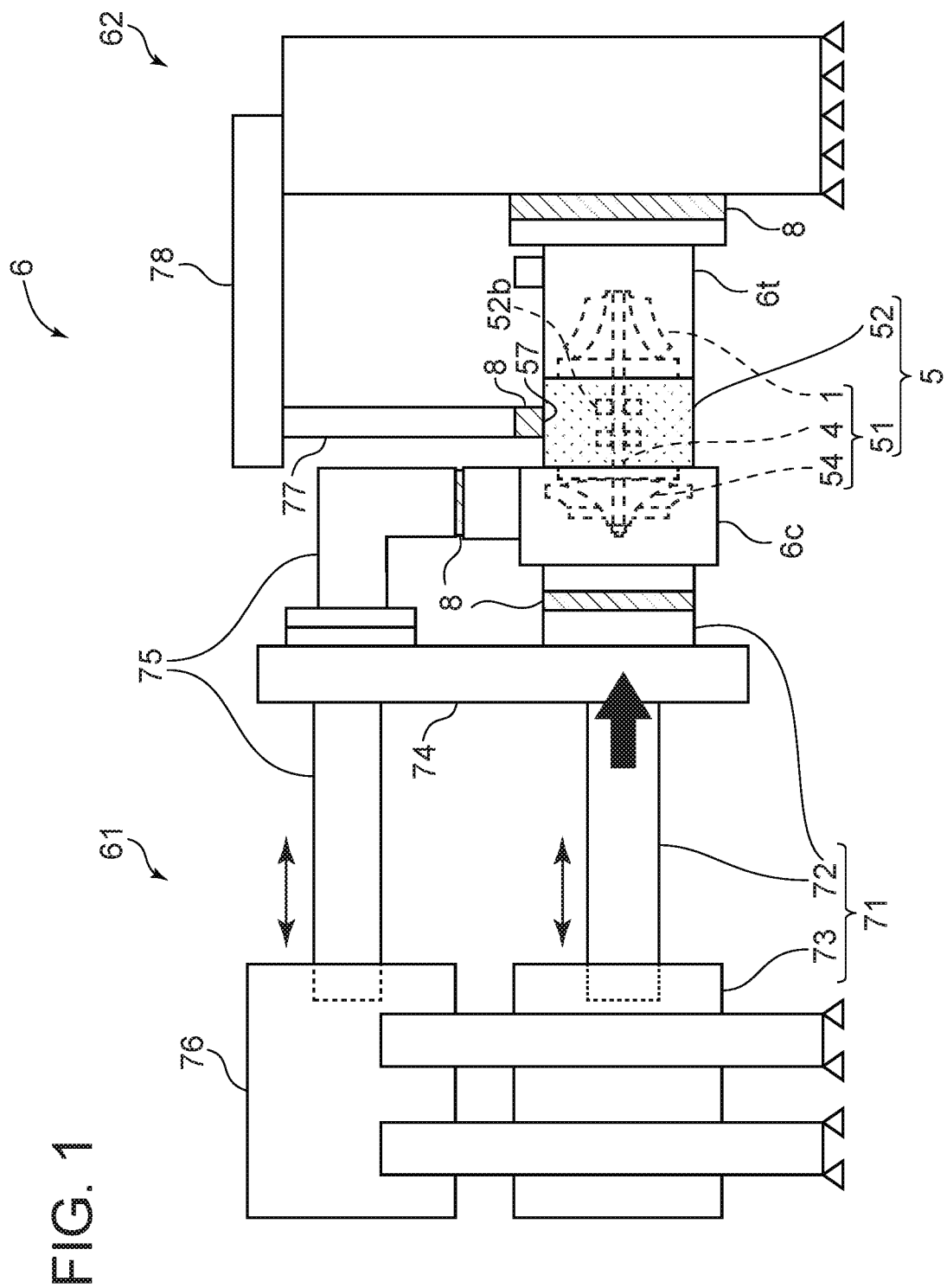
FIG. 1 is a schematic diagram of an unbalance detection device used in unbalance correction works of a turbo-cartridge according to an embodiment of the present invention, where the turbo-cartridge is supported by the unbalance detection device.

FIG. 1 is a schematic diagram of an unbalance detection device 6 according to an embodiment of the present invention, used in an unbalance correcting work for a turbo-cartridge 5, illustrating a state where the turbo-cartridge 5 is supported by the unbalance detection device 6.

The turbo-cartridge 5 is a core member of a turbocharger, and includes a rotor 51 integrally coupling a mixed-flow turbine wheel 1 and a compressor wheel 54 with a rotational shaft 4, and a bearing housing 52 that accommodates a bearing 52b supporting the rotor 51 rotatably. Further, when the turbo-cartridge 5 is provided for an engine of a non-depicted automobile, for instance, the turbo-cartridge 5 is configured such that the mixed-flow turbine wheel 1 disposed in the exhaust passage of the engine rotates due to exhaust gas discharged from the engine, and thereby the compressor wheel 54 coaxially coupled by the rotational shaft 4 rotates in the intake passage of the engine, thereby compressing intake air to the engine.

Furthermore, the unbalance detection device 6 is a device for supporting a work target object during the unbalance correction work. In the embodiment depicted in FIG. 1, the unbalance detection device 6 nips the turbo-cartridge 5 from both sides to support the turbo-cartridge 5, with two housing members including a turbine-side housing member 6t and a compressor-side housing member 6c. More specifically, the unbalance detection device 6 supports the turbo-cartridge 5 by pressing at least one of the two housing members to the other one of the two housing member, with a support mechanism, while the mixed-flow turbine wheel 1 and the compressor wheel 54 of the cartridge 5 are housed inside the two housing members 6h (6t, 6c).

More specifically, in the embodiment depicted in FIG. 1, the support mechanism of the unbalance detection device 6 includes a compressor-side support mechanism 61 connected to the compressor-side housing member 6c, and a turbine-side support mechanism 62 connected to the turbine-side housing member 6t. Each support mechanism (61, 62) is fixed to the ground of a factory, for instance, so that the turbo-cartridge 5 does not move when pushed. Further, above the ground surface, the support mechanism (61, 62) is connected to the two housing members 6h (6t, 6c) via a vibration insulating member 8 (e.g. elastic member such as rubber). Furthermore, the compressor-side support mechanism 61 includes a pressing device 71 configured to press the compressor-side housing member 6c toward the turbo-cartridge 5. The pressing device 71 includes a pressing rod 72 connected to the housing member (6c), and a piston device 73 that pushes the pressing rod 72 out toward the housing member (6c). The piston device 73 pushes the pressing rod 72 toward the housing member (6c), and thereby the compressor-side housing member (6c) is pressed toward the turbo-cartridge 5. At this time, the pressing device 71, the compressor-side housing member 6c, the turbo-cartridge 5, the turbine-side housing member 6t, and the turbine-side support mechanism 62 are arranged in this order along the pressing direction (direction of the arrow in FIG. 1), and the pressing force by the pressing device 71 is transmitted to the turbine-side support mechanism 62 via the arrangement of the above. The turbo-cartridge 5 is supported by the pressing force from the pressing device 71 and the reactive force from the turbine-side support mechanism 62. Furthermore, the pressing rod 72, and an air supply pipe 75 for guiding air from a blower 76 to the housing member are coupled to each other via a coupling member 74, and the air supply pipe 75 is configured to be movable so as to expand and contract from the blower 76 as the pressing rod 72 moves in the pressing direction.

Further, in the embodiment depicted in FIG. 1, the unbalance detection device 6 includes an oil supply pipe 77 for supplying lubricant oil to the bearing 52b housed in the bearing housing 52. The oil supply pipe 77 is supported on the tip side of a support arm 78 extending toward above the compressor-side support mechanism 61 from an upper part of the turbine-side support mechanism 62. The support arm 78 is configured to be capable of moving the oil supply pipe 77 up and down along the vertical direction. Further, by moving the oil supply pipe 77 downward in the vertical direction (gravity direction) and connecting the oil supply pipe 77 to an oil supply port 57 formed on the bearing housing 52, it is possible to supply lubricant oil to the bearing 52b via the oil supply port 57. Further, the oil supply pipe 77 is connected to the oil supply port 57 of the bearing housing 52 via the vibration insulating member 8.

Further, in the unbalance correction work, while the unbalance detection device 6 supports the work target object, the work target object is rotated similarly as being rotated due to exhaust gas during operation of the engine, and thereby unbalance of the work target object is detected. Specifically, in a case where the work target object is the rotor 51, air (gas) is supplied to one of the compressor wheel 54 or the mixed-flow turbine wheel 1, and thereby the rotor 51 is rotated. In the embodiment depicted in FIG. 1, the air supply pipe 75 of the support mechanism and the compressor-side housing member 6c are connected via the vibration insulating member 8, and air from the blower 76 is supplied to the compressor wheel 54 housed in the compressor-side housing member 6c, via the air supply pipe 75. As the compressor wheel 54 rotates, the mixed-flow turbine wheel 1 rotates. In some other embodiments, the air supply pipe 75 and the turbine-side housing member 6*t* are connected, and thereby air may be supplied to the mixed-flow turbine wheel 1 to rotate the rotor 51.

In a case where the work target object is the mixed-flow turbine wheel 1, the mixed-flow turbine wheel 1 is rotated in a state of being coupled to only the rotational shaft 4, for unbalance detection. In this case, the work target object may be supported by another unbalance detection device different than the unbalance detection device 6 depicted in FIG. 1. That is, the above described other unbalance detection device 6 only needs to be able to support the mixed-flow turbine wheel 1 and the rotational shaft 4 rotatably. For instance, the unbalance detection device 6 may be such a device that does not include the above described two housing members (6*t*, 6*c*), but rotates the mixed-flow turbine wheel 1 by blowing air toward the mixed-flow turbine wheel 1 while supporting the mixed-flow turbine wheel 1 without covering the same. Description will be continued below with reference to FIG. 1, where the work target object is the rotor 51.

Figure 2:
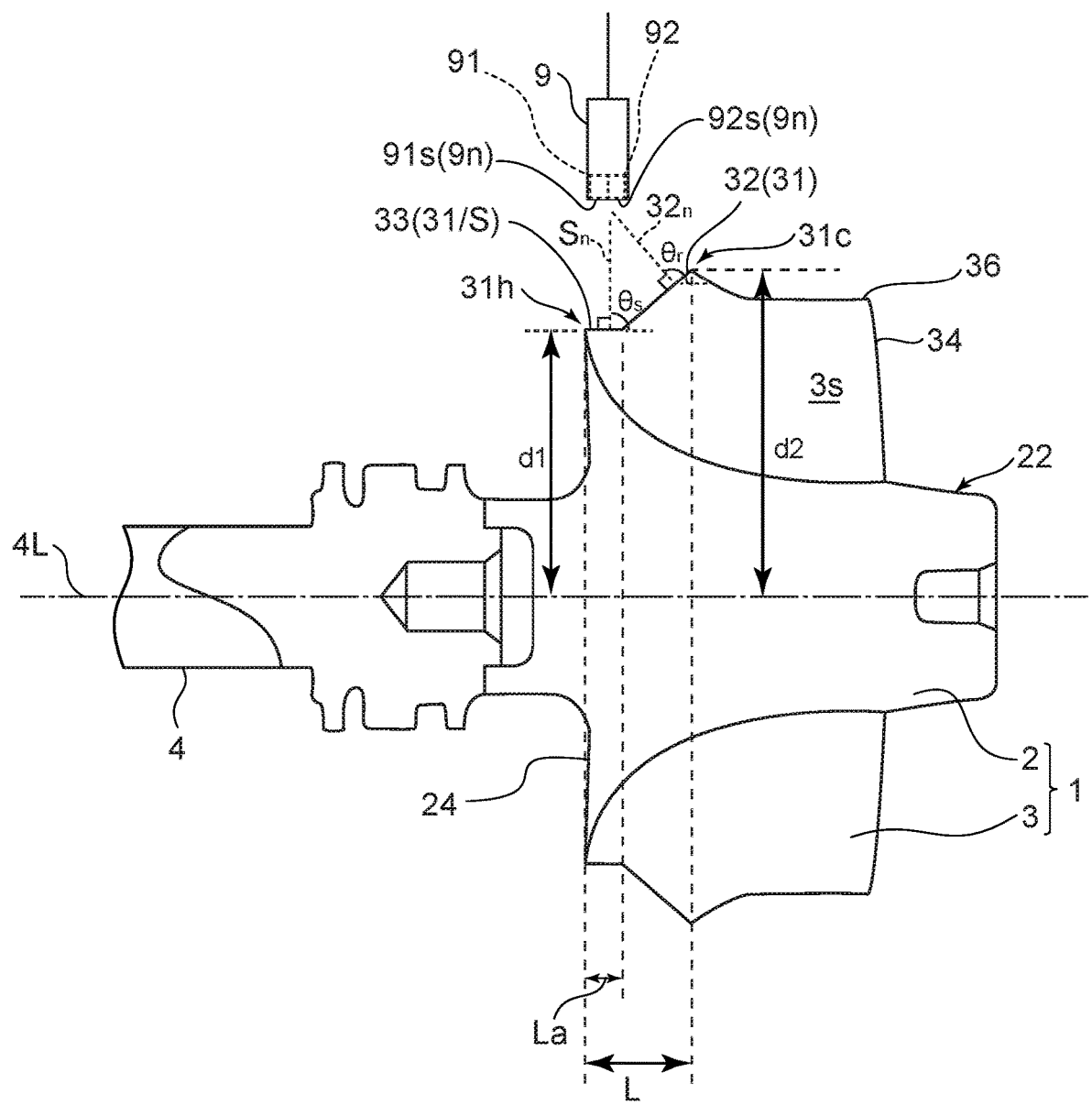
FIG. 2 is a schematic diagram showing a mixed-flow turbine wheel according to an embodiment of the present invention in a meridional view, where the sensor detection surface is formed on the first parallel edge portion positioned on the leading-edge hub side end of the reference rotor blade.

Furthermore, the unbalance detection device 6 includes an optical sensor device 9 for detecting the rotation speed (phase) of the rotor 51 to obtain grinding information for correcting detected unbalance of the rotor 51. The grinding information includes the optimum mass and the optimum grinding position for balancing the rotor 51 (work target object), and when unbalance is detected, the rotor 51 (work target object) is ground on the basis of the grinding information. Further, the optical sensor device 9 is disposed so as to be capable of facing the sensor detection surface S having a flat shape formed on the rotor 51 (work target object). In the embodiment depicted in FIG. 1 and FIGS. 2 to 6 described below, as depicted in FIG. 2 (not shown in FIGS. 3 to 6), the optical sensor device 9 includes a light emission part 91 configured to emit light and a light receiving part 92 configured to receive reflection light of light that the light emission part 91 emits. Further, the optical sensor device 9 (the light emission part 91 and the light receiving part 92) are disposed so as to pass by (face) the sensor detection surface S every time the rotor 51 (work target object) rotates once. Further, the sensor detection surface S having a flat shape is applied with a marking, which is grinding or paint coating, and the refractive index of the sensor detection surface S applied with a marking is different from the refractive index of a portion other than the sensor detection surface S not applied with marking. Thus, reflection light received by the optical sensor device 9 (light receiving part) is different between when the optical sensor device 9 is facing the sensor detection surface S and when facing a portion other than the sensor detection surface S. The optical sensor device 9 detects the sensor detection surface S on the basis of the difference of reflection light (e.g. the strength of reflection light), and detects the rotation speed (phase). The optical sensor device 9 may be a fiber sensor, for instance. Further, the optical sensor device 9 (the light emission part 91 and the light receiving part 92) is disposed close to the sensor detection surface S to be within a range of predetermined detection limit of 1 to 2 mm, for instance. However, in the description, the distance between the optical sensor device 9 and the sensor detection surface S depicted in FIGS. 2 to 6 does not correspond to the actual range of detection limit.

Figure 3:
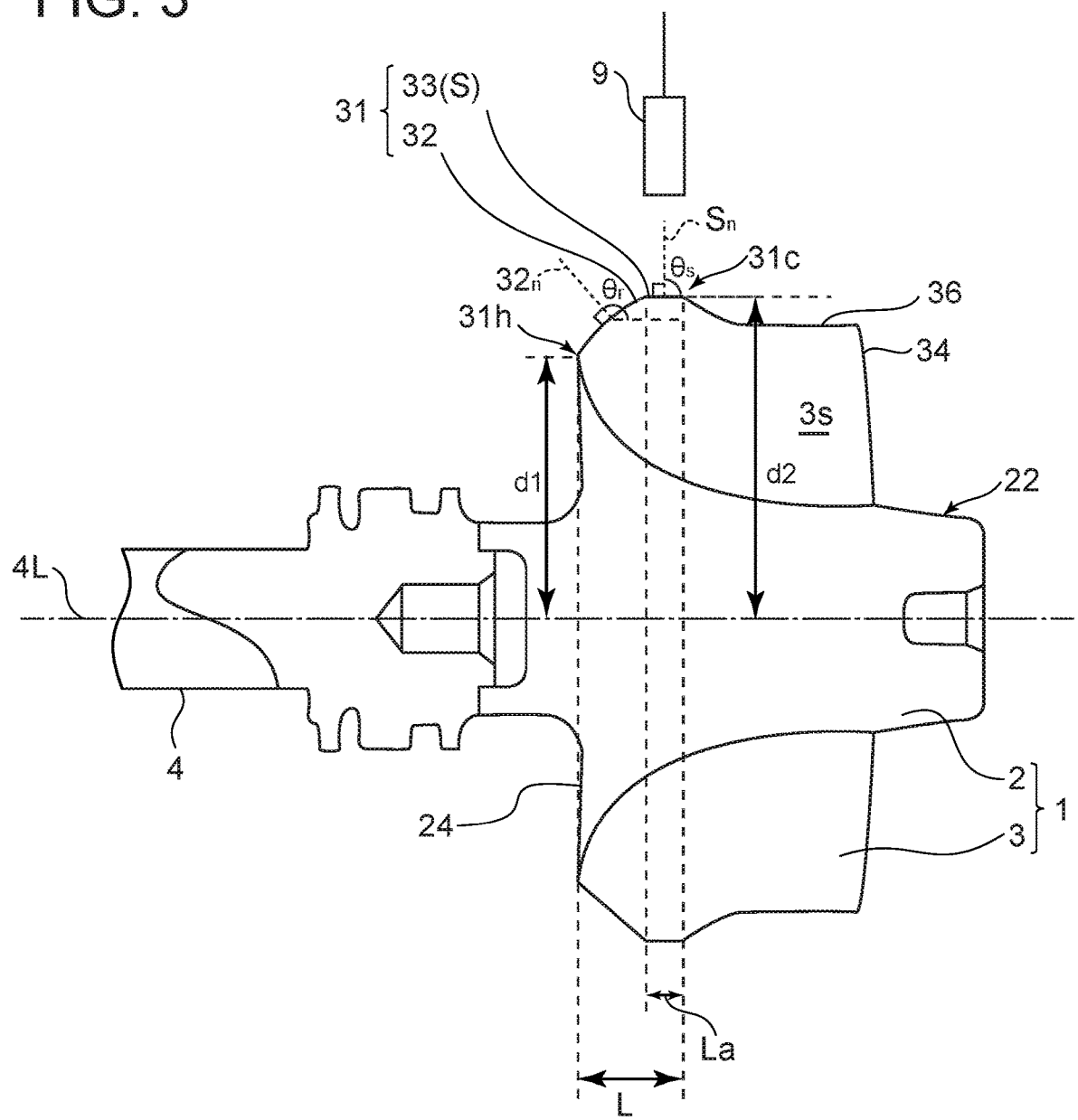
FIG. 3 is a schematic diagram showing a mixed-flow turbine wheel according to an embodiment of the present invention in a meridional view, where the sensor detection surface is formed on the first parallel edge portion positioned on the leading-edge tip side end of the reference rotor blade.
Figure 4:
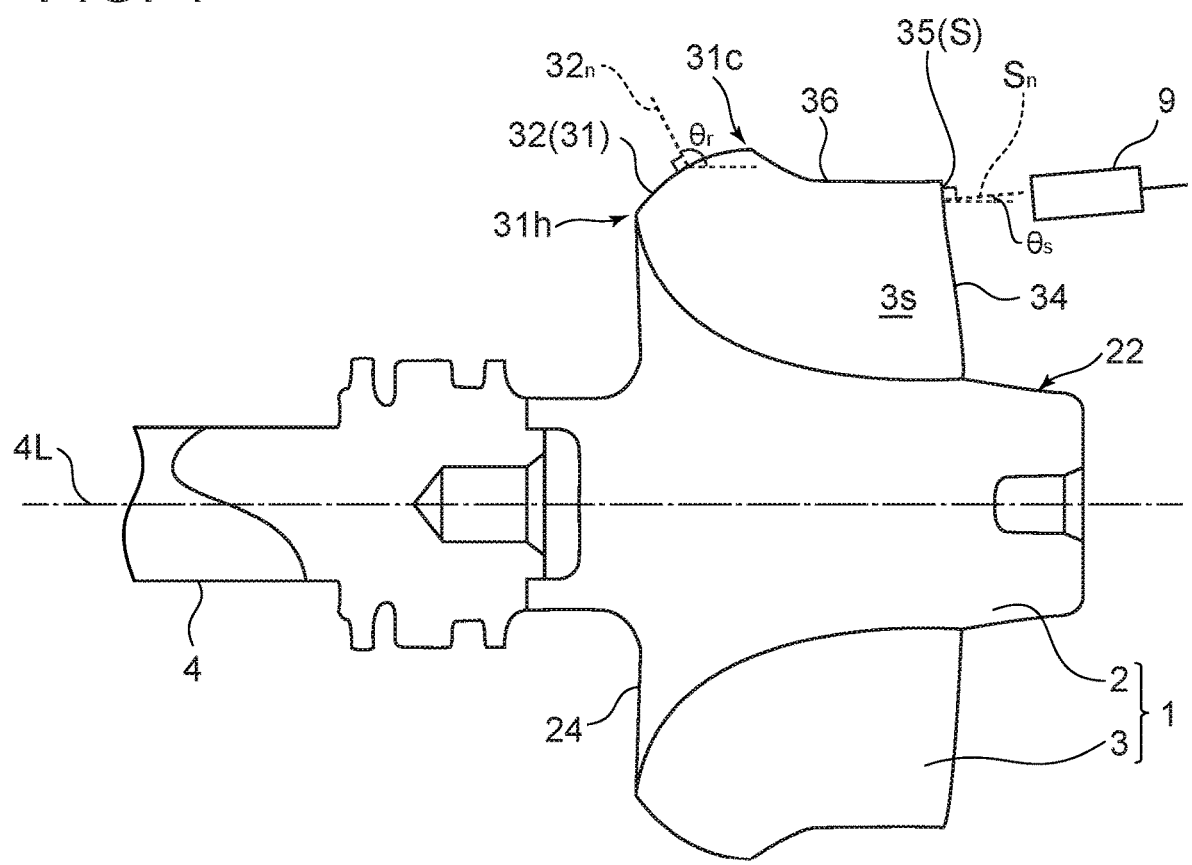
FIG. 4 is a schematic diagram showing a mixed-flow turbine wheel according to an embodiment of the present invention in a meridional view, where the sensor detection surface is formed on the trailing edge of the reference rotor blade.
Figure 5:
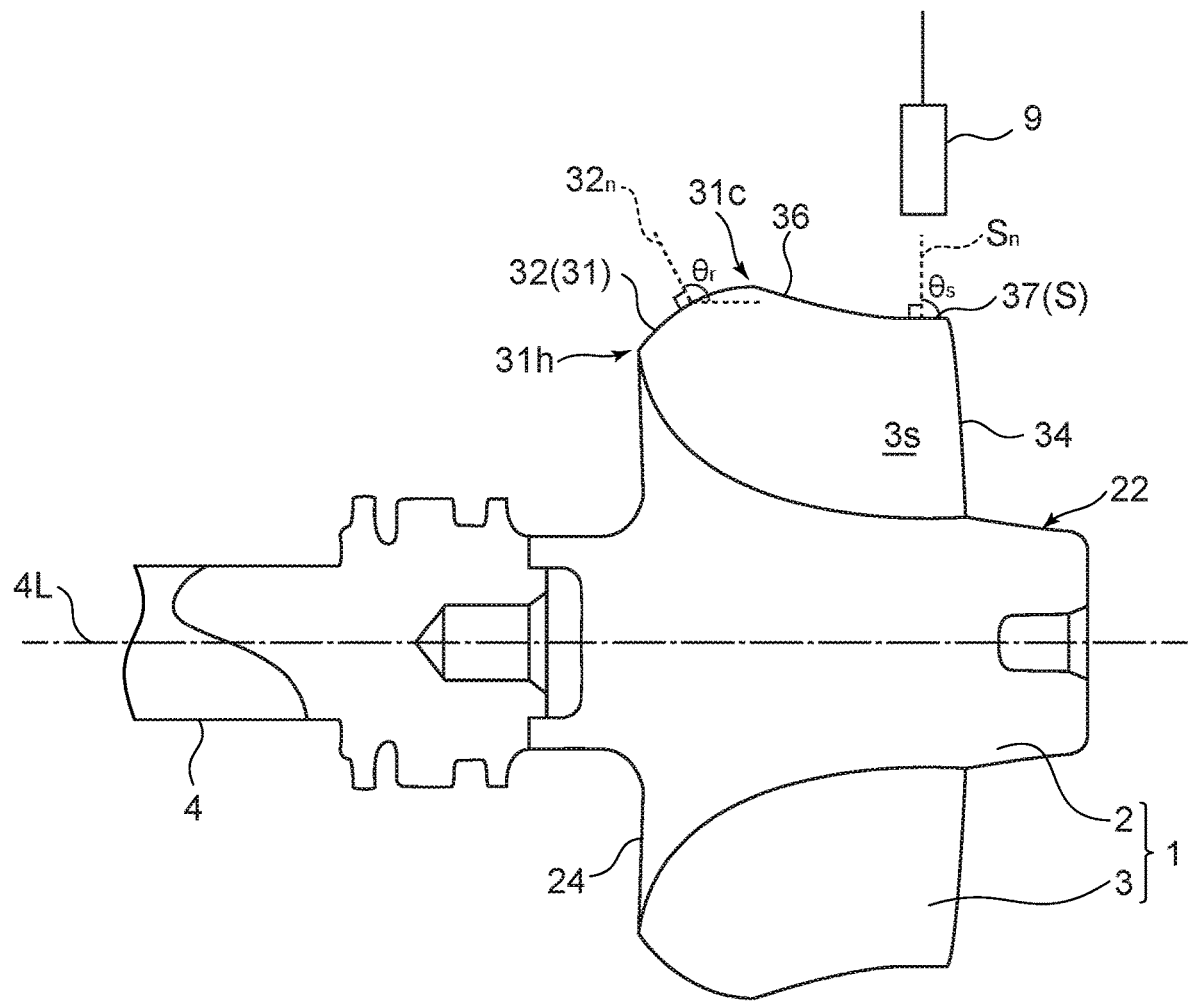
FIG. 5 is a schematic diagram showing a mixed-flow turbine wheel according to an embodiment of the present invention in a meridional view, where the sensor detection surface is formed on the third parallel edge portion positioned on the shroud side end portion of the reference rotor blade.
Figure 6:
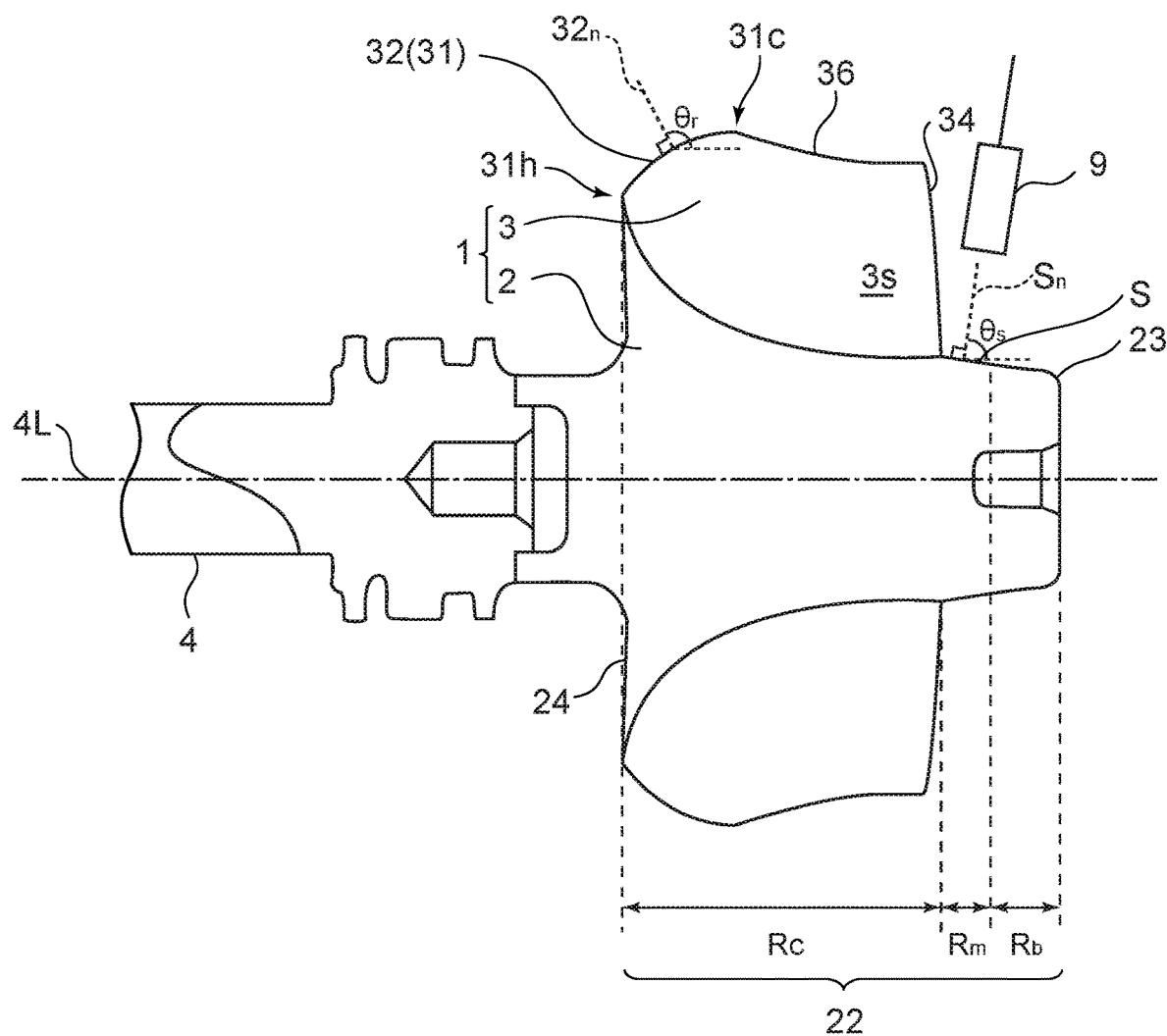
FIG. 6 is a schematic diagram showing a mixed-flow turbine wheel according to an embodiment of the present invention in a meridional view, where the sensor detection surface is formed in the intermediate region of the circumferential surface of the hub.
Figure 7:
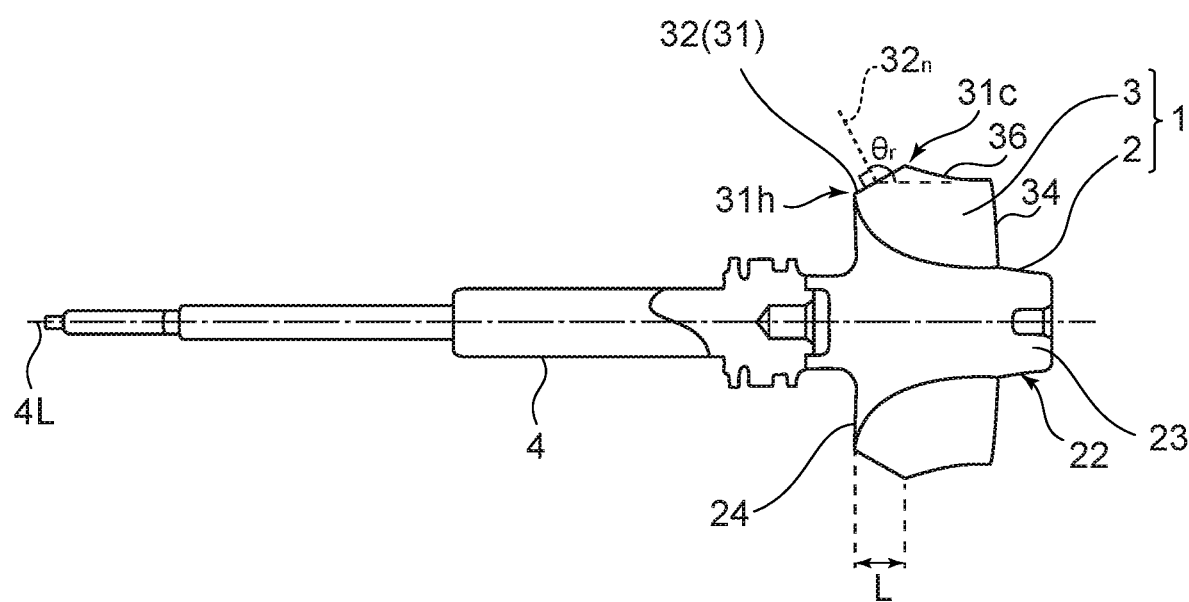
FIG. 7 is a comparative example of a mixed-flow turbine wheel, where the oblique edge portion of the leading edge is formed to have a linear shape.
Figure 8:
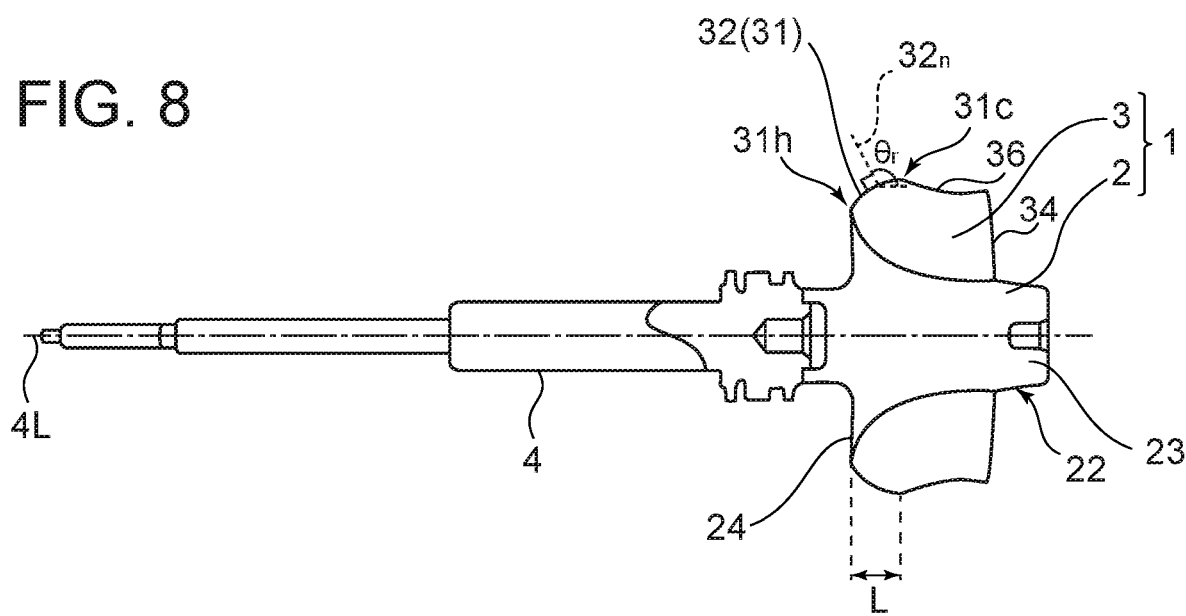
FIG. 8 is a comparative example of a mixed-flow turbine wheel, where the oblique edge portion of the leading edge is formed to have an arc shape.

Next, the mixed-flow turbine wheel 1 according to the present invention will be described with reference to FIGS. 2 and 8. FIGS. 2 to 6 are each a schematic diagram showing a mixed-flow turbine wheel according to an embodiment of the present invention in a meridional view. FIGS. 7 and 8 are each a comparative example of a mixed-flow turbine wheel. In FIG. 2, the sensor detection surface S is formed on the first parallel edge portion 33 positioned on the leading-edge hub side end of the reference rotor blade 3*s*. In FIG. 3, the sensor detection surface S is formed on the first parallel edge portion 33 positioned on the leading-edge tip side end of the reference rotor blade 3*s*. In FIG. 4, the sensor detection surface S is formed on the trailing edge of the reference rotor blade 3*s*. In FIG. 5, the sensor detection surface S is formed on the third parallel edge portion 37 positioned on the shroud-side edge portion 36 of the reference rotor blade 3*s*. In FIG. 6, the sensor detection surface S is formed in the intermediate region Rm of the circumferential surface 22 of the hub 2. Furthermore, in the comparative example of FIG. 7, the oblique edge portion 32 of the leading edge 31 is formed to have a linear shape in a meridional view. Furthermore, in the comparative example of FIG. 8, the oblique edge portion 32 of the leading edge 31 is formed to have an arc shape in a meridional view. In the following description, the direction along the axis 4L of the rotational shaft 4 is referred to as the axial direction, and the direction orthogonal to the axis 4L of the rotational shaft 4 is referred to as the radial direction. Furthermore, the side of the mixed-flow turbine wheel 1 in the axial direction (the right side of the sheet) is referred to as the trailing edge side of the axial direction, and the opposite direction thereof (the left side of the sheet) is referred to as the leading-edge side of the axial direction.

As shown in FIGS. 2 to 8, the mixed-flow turbine wheel 1 includes a hub 2 fixed to the rotational shaft 4, and a plurality of rotor blades 3 disposed at intervals in the circumferential direction on the circumferential surface 22 of the hub 2. More specifically, the circumferential surface 22 of the hub 2 includes a boss region Rb formed along the circumferential direction by a boss portion 23 disposed on the tip (tip of the trailing edge side in the axial direction) of the hub 2, a rotor-blade region Rc formed along the circumferential direction of the rotational shaft 4 where a plurality of rotor blades 3 are installed, and an intermediate region Rm being a region between the boss region Rb and the rotor-blade region Rc (see FIG. 6). Further, the rotor blade 3 disposed in the rotor-blade region Rc includes edge portions including a leading edge 31 having an oblique edge portion 32, a trailing edge 34, and a shroud-side edge portion 36 connected to each of the tip-side end 31*c* of the leading edge 31 and the trailing edge 34. The tip-side end 31*c* of the leading edge 31 is an end portion opposite to a hub-side end 31*h*, where the hub-side end 31*h* refers to the end portion positioned on the side of the circumferential surface 22 of the hub 2, of the end portions (31*c*, 31*h*) of the leading edge 31. Further, of the edge portions of the rotor blade 3, the above leading edge 31 is a portion positioned on the inlet side supplied with exhaust gas after passing through the scroll portion (not shown) of the turbine when the turbocartridge 5 is installed in the engine, and the above trailing edge 34 is a portion positioned on the outlet side of exhaust gas. The shroud-side edge portion 36 is a portion facing the inner wall of the turbine housing (not shown) accommodating the mixed-flow turbine wheel 1, of the edge portions of the rotor blade 3.

Further, each of the plurality of rotor blades 3 of the mixed-flow turbine wheel 1 is configured such that the leading edge 31 of each of the plurality of rotor blades 3 includes an oblique edge portion 32 where the distance between the leading edge 31 and the axis 4L of the rotational shaft 4 decreases from the tip side toward the hub side. Further, the oblique edge portion 32 of the rotor blade 3 includes two types: one formed to have a linear shape in a meridional view (see FIGS. 2 and 7); and one formed to have an arc shape protruding in a direction away from the rotational shaft 4 in the radial direction from the line connecting the tip-side end 31c and the hub-side end 31h of the leading edge 31 connected to the hub 2 (see FIGS. 3 to 6, 8).

In the mixed-flow turbine wheel 1 having the above configuration, the mixed-flow turbine wheel 1 according to an embodiment of the present invention includes a sensor detection surface S having a flat shape applied with a marking that is detectable by the optical sensor device 9 as depicted in FIGS. 2 to 6. The sensor detection surface S is formed on at least one of the circumferential surface 22 of the hub 2 or an edge portion (31, 34, 36) of the reference rotor blade 3s being one of the plurality of rotor blades 3, such that, in a meridional view, a trailing-edge side angle of two angles formed between the axis 4L of the rotational shaft 4 and a normal Sn of the sensor detection surface S (hereinafter, sensor-detection-surface angle θr) is smaller than a trailing-edge side angle of two angles formed between the axis 4L of the rotational shaft 4 and a normal 32n of the oblique edge portion 32 (hereinafter, oblique-surface angle θs). Further, the sensor detection surface S applied with the marking has a refractive index which is different from a refractive index of the circumferential surface 22 of the hub 2 or the edge portion of the reference rotor blade 3s other than the sensor detection surface S. Further, the above reference rotor blade 3s is a rotor blade 3 on which the sensor detection surface S is to be formed, and may be any one of the plurality of rotor blades 3, or at least one rotor blade may be selected as the reference rotor blade 3s.

More specifically, the oblique edge portion 32 of the mixed-flow turbine wheel 1 is normally formed such that the normal 32n of the oblique edge portion 32 is oblique toward the opposite side of the position of the boss portion 23 with respect to a line orthogonal to the axis 4L of the rotational shaft 4, whether the oblique edge portion 32 has a linear shape or an arc shape. Thus, the oblique-edge angle θr is an obtuse angle larger than 90 degrees (see FIGS. 2 to 8). Herein, the optical sensor device 9 needs to be disposed close to the sensor detection surface S so as to be within the range of detection limit and so as to be capable of facing the sensor detection surface S, along the extension direction of the normal 32n of the sensor detection surface S. Further, normally, the boss portion 23 or the back surface 24 (back plate portion) of the mixed-flow turbine wheel 1 is ground for unbalance correction. The inventors of the present inventions thought that the sensor detection surface S should preferably be a position different from a portion that has the risk of being ground for unbalance correction. Thus, for instance, for the mixed-flow turbine wheel 1 having the oblique edge portion 32 having a linear shape depicted in FIG. 7 as a comparative example, a part of the oblique edge portion 32 may be used as the sensor detection surface S.

However, along the direction of extension of the normal 32n of the oblique edge portion 32, as depicted in FIG. 1, the bearing housing 52 of the turbo-cartridge 5, and the unbalance detection device 6 exist (e.g. the above described oil supply pipe 77 and the air supply pipe 75 in FIG. 1). That is, the bearing housing 52 of the turbo-cartridge 5 and the unbalance detection device 6 may be interfered with, and thus it is difficult to install the optical sensor device 9. Furthermore, as depicted in FIG. 8 as a comparative example, in a case where the oblique edge portion 32 has an arc shape, it is difficult to use the oblique edge portion 32 as the sensor detection surface S in the first place. Furthermore, there has been no example of using another portion as the sensor detection surface S for the mixed-flow turbine wheel 1.

Under this situation, the inventors of the present invention conducted intensive researches and arrived at the idea to form the sensor detection surface S on the circumferential surface 22 of the hub 2 or the edge portion of the reference rotor blade 3s by correcting the shape of the circumferential surface 22 of the hub 2 or the shape of the edge portion of the reference rotor blade 3s so that the sensor-detection-surface angle θs becomes smaller than the oblique-edge angle θr. In this way, it is possible to install the optical sensor device 9 without interfering with the bearing housing 52 of the turbo-cartridge 5 and the unbalance detection device 6. As in the embodiment depicted in FIGS. 2 to 6 described below, the sensor-detection-surface angle θs should preferably be 90 degrees or smaller (θs≤90 degrees). By installing the optical sensor device 9 in this direction, it is possible to install the optical sensor device 9 without interfering with the unbalance detection device 6. Furthermore, while the shape of the rotor blade 3 is normally determined so as to be able to meet the required performance, as described with reference to FIGS. 2 to 6 described below, the sensor detection surface S is formed on a portion that suppresses influence of the shape correction of the reference rotor blade 3s on the performance.

With the above configuration, the normal Sn of the sensor detection surface S extends toward the trailing edge side (tip side of the hub 2) in the axial direction of the rotational shaft 4 relatively compared to the normal of the oblique edge portion 32. That is, it is possible to install the optical sensor device 9 in a position relatively remote from the center side of the rotational shaft 4. Thus, in the unbalance correction work of each of the mixed-flow turbine wheel 1 and the turbo-cartridge 5 including the mixed-flow turbine wheel 1 using the unbalance detection device 6, it is possible to provide the optical sensor device 9 for detecting the rotational position of the mixed-flow turbine wheel 1 so as to be capable of facing the sensor detection surface S of the mixed-flow turbine wheel 1 without physically interfering the unbalance detection device 6. Accordingly, it is possible to provide the mixed-flow turbine wheel 1 including the sensor detection surface S which enables appropriate acquisition of information required for the unbalance correction work, such as the rotation speed (rotation phase) of the mixed-flow turbine wheel 1.

Next, some embodiments related to the sensor detection surface S formed on the mixed-flow turbine wheel 1 will be described with reference to FIGS. 2 and 6.

In some embodiments, as depicted in FIGS. 2 and 3, the leading edge 31 of the reference rotor blade 3s includes the first parallel edge portion 33 connected to the oblique edge portion 32 and extending in a direction parallel to the axis of the rotational shaft 4, and the sensor detection surface S is formed on the first parallel edge portion 33. In other words, the leading edge 31 of the reference rotor blade 3s is formed by the oblique edge portion 32 and the first parallel edge portion 33. In the present embodiment, as depicted in FIGS. 2 to 3, the first parallel edge portion 33 is parallel to the axis 4L of the rotational shaft 4 in a meridional view, and thus the above described sensor-detection-surface angle θs is 90 degrees. On the other hand, as described above, the oblique-edge angle θr is an obtuse angle larger than 90 degrees. Thus, the sensor-detection-surface angle θs is smaller than the oblique-edge angle θr (θr>θs).

With the above configuration, the sensor detection surface S is formed by forming the shape of the end portion side of the leading edge 31 of the reference rotor blades 3s to be parallel to the axis 4L of the rotational shaft 4 (first parallel edge portion 33), and by utilizing the thickness of the first parallel edge portion 33. The mixed-flow turbine wheel 1 is formed of a hard material to withstand exposure to high-temperature exhaust gas, and is difficult to machine-process compared to the compressor wheel 54. Meanwhile, in the mixed-flow turbine wheel 1 according to an embodiment of the present invention, the leading edge 31 of the reference rotor blade 3s is formed so as to have the first parallel edge portion 33. Thus, machine-processing for forming the sensor detection surface S, such as grinding the circumferential surface 22 of the hub 2, is unnecessary, and the sensor detection surface S can be also formed on a small mixed-flow turbine wheel 1. Furthermore, by forming the first parallel edge portion 33 on the end portion side of the leading edge 31 of the reference rotor blade, it is possible to reduce the extent of shape change to a typical mixed-flow turbine wheel 1 not having the first parallel edge portion 33. Thus, it is possible to form the sensor detection surface S easily while suppressing the influence of the first parallel edge portion 33 on the performance of the turbocharger.

Further, for instance, in a case where the sensor detection surface S is formed on the leading edge 31 in a radial turbine wheel where the leading edge 31 of the rotor blade 3 is parallel to the axis 4L of the rotational shaft 4, the optical sensor device 9 can be provided similarly to the sensor detection surface S formed on the first parallel edge portion 33 of the mixed-flow turbine wheel 1 of the present invention. That is, common equipment of the unbalance detection device 6 for unbalance correction can be used for different kinds of turbine wheels, and it is possible to reduce the production costs.

The embodiment related to the first parallel edge portion 33 will be described in detail. In some embodiments as depicted in FIG. 2, the first parallel edge portion 33 of the leading edge 31 of the reference rotor blade 3s on which the sensor detection surface S is formed is formed on a position including the hub-side end 31h of the leading edge 31 in a meridional view. That is, the first parallel edge portion 33 forms the hub-side end 31h of the leading edge 31. Normally, the distance d1 between the hub-side end 31h of the leading edge and the rotational shaft 4 (e.g. axis 4L) is shorter than the distance d2 between the rotational shaft 4 and the tip-side end 31c of the leading edge 31. Thus, the influence on the torque of the rotational shaft 4 is smaller at the hub-side end 31h of the leading edge 31 than at the tip-side end 31c. Furthermore, the first parallel edge portion 33 formed on a position including the hub-side end 31h is at the end of the main flow of exhaust gas supplied from the scroll part (not depicted) of the turbine, where a smaller amount of exhaust gas flows than at the oblique edge portion 32 of the leading edge 31. That is, in a case where the first parallel edge portion 33 is formed on a position including the hub-side end 31h, the first parallel edge portion 33 can be formed so as to be out of the position (flow path) where the flow of exhaust gas exists.

With the above configuration, by forming the first parallel edge portion 33 on the hub-side end 31h of the leading edge 31 of the reference rotor blade 3s, it is possible to form the sensor detection surface S easily while suppressing the influence of the first parallel edge portion 33 on the performance of the turbocharger. Furthermore, the hub 2 has a back plate portion forming the back surface 24 of the hub 2, and for instance, in a case where the sensor detection surface S is formed by utilizing the first parallel edge portion 33 and the side surface (thickness) of the back plate portion, it is possible to further reduce the extent of shape change on the hub-side end of the reference rotor blade 3s (change from the oblique shape due to the oblique edge portion 32 to the shape parallel to the axis 4L of the rotational shaft 4), and thus it is possible to further reduce the influence of the first parallel edge portion 33 on the performance of the turbocharger.

Furthermore, particularly in the embodiment depicted in FIG. 2, as shown in the drawing, the oblique edge portion 32 of the leading edge 31 of the reference rotor blade 3s is formed to have a linear shape in a meridional view. That is, in a meridional view, the first parallel edge portion 33 formed on a position including the hub-side end 31h is connected to the oblique edge portion 32 having a linear shape and including the tip-side end 31c. As described above, for the reference rotor blade 3s having the oblique edge portion 32 formed to have a linear shape, by forming the first parallel edge portion 33 on the hub-side end 31h of the leading edge 31 of the reference rotor blade 3s, it is possible to form the sensor detection surface S easily while suppressing the influence of the first parallel edge portion 33 on the performance of the turbocharger. That is, the obtuse angle formed between the axis 4L of the rotational shaft 4 and the tangent to the closest end, to the hub-side end 31h, of the oblique edge portion 32 formed to have a linear shape is greater than the obtuse angle formed between the axis 4L of the rotational shaft 4 and the tangent to the closest end, to the hub-side end 31h, of the oblique edge portion 32 formed to have an arc shape. This means that, when connecting to the first parallel edge portion 33 forming the hub-side end 31h, the oblique edge portion 32 formed to have a linear shape can connect more smoothly than the oblique edge portion 32 formed to have an arc shape. In other words, for the reference rotor blade 3s having the oblique edge portion 32 formed to have a linear shape, by forming the first parallel edge portion 33 on the hub-side end 31h of the leading edge 31 of the reference rotor blade 3s, it is possible to reduce the shape change amount due to the first parallel edge portion 33.

Further, in some other embodiments, the leading edge 31 maybe formed by the first parallel edge portion 33 forming the hub-side end 31h and the oblique edge portion 32 formed to have an arc shape.

Furthermore, in some other embodiments related to the first parallel edge portion 33, the first parallel edge portion 33 of the leading edge 31 of the reference rotor blade 3s on which the sensor detection surface S is formed is formed on a position including the tip-side end 31c of the leading edge 31 in a meridional view.

With the above configuration, with the first parallel edge portion 33 being formed on the tip-side end 31c of the leading edge 31 of the reference rotor blade 3s, the sensor detection surface S formed on the first parallel edge portion 33 is formed on a position remote from the rotational shaft 4 compared to a case where the first parallel edge portion 33 is formed on the hub-side end 31h. Herein, the optical sensor device 9 is supported on a position away from the rotational shaft 4 by the unbalance detection device 6, around the turbo-cartridge 5. At this time, with the first parallel edge portion 33 being formed on the tip-side end 31c of the leading edge 31 of the reference rotor blade 3s, the optical sensor device 9 can be provided to a position closer to the support position of the optical sensor device 9 without extending from the support position toward the vicinity of the rotational shaft 4, and thus it is possible to install the optical sensor device 9 more stably and easily.

Furthermore, particularly in the embodiment depicted in FIG. 3, as shown in the drawing, the oblique edge portion 32 of the leading edge 31 of the reference rotor blade 3s is formed to have an arc shape protruding toward a line connecting the hub-side end 31h and the tip-side end 31c of the leading edge 31 in a meridional view. That is, in a meridional view, the first parallel edge portion 33 formed on a position including the tip-side end 31c is connected to the oblique edge portion 32 having an arc shape and including the hub-side end 31h. Further, in a case where the oblique edge portion 32 has an arc shape, the normal 32n of the oblique edge portion 32 is greater than 90 degrees at any position of the oblique edge portion 32 having an arc shape. In this way, it is possible to form the sensor detection surface S easily while suppressing the influence of the first parallel edge portion 33 on the performance of the turbocharger. That is, the angle formed between the axis 4L of the rotational shaft 4 and the tangent to the closest end, to the tip-side end 31c, of the oblique edge portion 32 formed to have an arc shape is smaller than the angle formed between the axis 4L of the rotational shaft 4 and the tangent to the closest end, to the tip-side end 31c, of the oblique edge portion formed to have a linear shape. Thus, when connecting to the first parallel edge portion 33 forming the tip-side end 31c, the oblique edge portion 32 formed to have an arc shape can connect more smoothly than the oblique edge portion 32 formed to have a linear shape.

Further, in some other embodiments, the leading edge 31 maybe formed by the first parallel edge portion 33 forming the tip-side end 31c and the oblique edge portion 32 formed to have a linear shape.

Further, in some embodiments, as depicted in FIGS. 2 and 3, in a meridional view, when defining that L is the length of the leading edge 31 of the reference rotor blade 3s in the direction along the axis 4L of the rotational shaft 4 and La is the length of the first parallel edge portion 33 in the direction along the axis 4L of the rotational shaft 4, La/L is not greater than ⅓ (3La≤L). By forming the first parallel edge portion 33 so as to satisfy this condition, it is possible to form the first parallel edge portion 33 while satisfying the required performance of the turbocharger. More preferably, La/L should preferably smaller, such as La/L being ⅕ or smaller, because the influence of formation of the first parallel edge portion 33 on the performance becomes smaller. Herein, La needs to be not smaller than the detection limit length that can be detected by the optical sensor device 9.

With the above configuration, it is possible to increase the flexibility of installment of the optical sensor device while suppressing the influence of the first parallel edge portion 33 on the performance of the turbocharger.

Further, in some embodiments, as depicted in FIG. 4, the trailing edge 34 of the reference rotor blade 3s includes the second parallel edge portion formed to have a linear shape, in a meridional view, and the sensor detection surface S is formed on the second parallel edge portion 35. As depicted in FIG. 4, the normal of the second parallel edge portion 35 formed on the trailing edge 34 of the rotor blade 3 (the normal Sn of the sensor detection surface S) extends toward the trailing edge side of the above described axial direction (the side with the boss portion 23), and thus the above described sensor-detection-surface angle θs is smaller than 90 degrees. On the other hand, as described above, the oblique-edge angle θr is larger than 90 degrees. Thus, the sensor-detection-surface angle θs is smaller than the oblique-edge angle θr (θr>θs). In the embodiment depicted in FIG. 4, the sensor detection surface S is formed on a position close to the connection portion to the shroud-side edge portion 36, of the trailing edge 34 of the rotor blade 3.

However, the position of the second parallel edge portion 35 is not limited to the position of FIG. 4, and may be a position on the trailing edge 34. Generally, the shape change of the trailing edge 34 of the rotor blade 3 has a small influence on the performance of the turbocharger. Thus, by providing the first parallel edge portion on the hub-side end of the leading edge, it is possible to form the sensor detection surface S with the second parallel edge portion 35 by utilizing the thickness of the trailing edge 34 of the reference rotor blade 3s so that the sensor-detection-surface angle θs becomes smaller than the oblique-edge angle θr.

Further, in some other embodiments, as depicted in FIG. 5, the shroud-side edge portion 36 of the reference rotor blade 3s includes the third parallel edge portion 37 connected to the trailing edge 34 and extending in a direction parallel to the axis of the rotational shaft 4 in a meridional view, and the sensor detection surface S is formed on the third parallel edge portion 37. As depicted in FIG. 5, the third parallel edge portion 37 is parallel to the axis 4L of the rotational shaft 4 in a meridional view, and thus the above described sensor-detection-surface angle θs is 90 degrees. On the other hand, the above described oblique-edge angle θr is larger than 90 degrees. Thus, the sensor-detection-surface angle θs is smaller than the oblique-edge angle θr (θr>θs).

With the above configuration, the sensor detection surface S is formed by forming the shape of the portion of the shroud-side edge portion 36 of the reference rotor blade 3s connected to the trailing edge 34 to be parallel to the axis 4L of the rotational shaft 4 (the third parallel edge portion 37), and by utilizing the thickness of the third parallel edge portion 37. Accordingly, the sensor-detection-surface angle θs is smaller than the oblique-edge angle θr, and thereby it is possible to install the optical sensor device 9 for detecting the rotational position of the mixed-flow turbine wheel without physically interfering the unbalance detection device 6 in unbalance correction work. In particular, the shroud-side edge portion 36 of the reference rotor blade 3s is a portion that becomes more parallel to the axis 4L of the rotational shaft 4 toward the trailing edge 34 from the leading edge 31, and thus it is possible to reduce the extent of shape change to a typical mixed-flow turbine wheel 1 not having the third parallel edge portion 37. Thus, it is possible to form the sensor detection surface S easily while suppressing the influence of the third parallel edge portion 37 on the performance of the turbocharger.

Further, in some other embodiments, the sensor detection surface S includes a flat surface formed in the intermediate region Rm of the circumferential surface 22 of the hub 2. The circumferential surface 22 of the hub 2 is usually a curved surface along the circumferential direction of the rotational shaft 4. Thus, in the present embodiment, it is necessary to form the sensor detection surface S having a flat shape by machine-processing a part of the intermediate region Rm of the circumferential surface 22 of the hub 2 into a flat shape, for instance. Further, as described above, the circumferential surface 22 of the hub 2 includes the boss region Rb, the rotor-blade region Rc, and the intermediate region Rm. Among the above, the boss region Rb is a portion that has the risk of being ground for unbalance correction. Thus, when the boss portion 23 is ground according to the above described grinding information, the sensor detection surface S having a flat shape may get ground too. If the sensor detection surface S is ground, the rotation speed can no longer be detected by the optical sensor device 9, and the future balancing work may be impaired. Meanwhile, in the rotor-blade region Rc, the rotor blade 3 is disposed so as to extend in the radial direction beyond the detection limit range of the optical sensor device 9 described above, and thus it is difficult to install the optical sensor device 9 for the risk of interference (collision) with the rotor blade 3 during rotation. Thus, the intermediate region Rm of the circumferential surface 22 of the hub 2 is a region suitable for forming the sensor detection surface S.

With the above configuration, the sensor detection surface S is formed by forming a flat surface partially in the intermediate region Rm between the rotor-blade region Rc and the boss region Rb on the circumferential surface 22 of the hub 2. Normally, the optical sensor device 9 needs to be positioned close to the sensor detection surface S so that the distance to the sensor detection surface S is a few millimeters (1 to 2 mm). By forming the sensor detection surface S in the intermediate region Rm, it is possible to install the optical sensor device while avoiding interference with the rotor blade 3 rotating along with rotation of the rotational shaft 4.

Furthermore, in the above described embodiment, the first parallel edge portion 33 (see FIGS. 2 and 3), the second parallel edge portion 35 (see FIG. 4), and the third parallel edge portion 37 (see FIG. 5) are formed on each of the plurality of rotor blades. However, this embodiment is not limitative. In some other embodiments, the first parallel edge portion 33, the second parallel edge portion 35, and the third parallel edge portion 37 may be formed on only one rotor blade 3 being the reference rotor blade 3s. In some other embodiments, the first parallel edge portion 33, the second parallel edge portion 35, and the third parallel edge portion 37 may be formed on all of the rotor blades 3.

Further, in some embodiments, an unbalance correction portion including a ground portion is formed on at least one of the back surface 24 of the hub 2 or the boss portion 23 of the hub 2. That is, the ground portion is formed by grinding, and one or more ground portions (ground locations) are collectively referred to as the unbalance correction portion. With the above configuration, the unbalance correction portion is the back surface 24 or the boss portion 23 of the hub 2. That is, the sensor detection surface S is formed on the circumferential surface 22 of the hub 2 or the edge portion of the reference rotor blade 3s, and thereby it is possible to prevent the sensor detection surface S from being ground due to the unbalance correction work.

Hereinafter, the unbalance correction method of the mixed-flow turbine wheel 1 according to an embodiment of the present invention will be described with reference to FIG. 9. FIG. 9 is a diagram showing an unbalance correction method for a mixed-flow turbine wheel 1 according to an embodiment of the present invention. The unbalance correction method may be applied to unbalance correction of the rotor 51 of the turbo-cartridge 5 including the above described mixed-flow turbine wheel 1 (see FIGS. 2 to 6), or to the mixed-flow turbine wheel 1 (see FIGS. 2 to 6) connected to the rotational shaft 4 before assembly of the turbo-cartridge 5.

Furthermore, as depicted in FIG. 9, the unbalance correction method for the mixed-flow turbine wheel 1 includes a marking step (S1 in FIG. 9) and an optical sensor installment step (S3 in FIG. 9). Hereinafter, the unbalance correction method of the mixed-flow turbine wheel 1 will be described along each step of FIG. 9, provided that the work target object of the unbalance correction work is the rotor 51 of the turbo-cartridge 5.

In step S1 of FIG. 9, the marking step is executed. The marking step is a step of applying the marking detectable by the optical sensor device 9 to the sensor detection surface S having a flat shape. Specifically, the sensor detection surface S is formed on the first parallel edge portion 33 (see FIGS. 2 and 3), the second parallel edge portion 35 (see FIG. 4), and the third parallel edge portion 37 (see FIG. 5) described above, and these portions are applied with markings in the present step. As described above, the sensor detection surface S is formed on at least one of the circumferential surface 22 of the hub 2 or an edge portion (31, 34, 36) of the reference rotor blade 3s being one of the plurality of rotor blades 3, such that, in a meridional view, a trailing-edge side angle of two angles formed between the axis 4L of the rotational shaft 4 and a normal Sn of the sensor detection surface S is smaller than a trailing-edge side angle of two angles formed between the axis 4L of the rotational shaft 4 and a normal 32n of the oblique edge portion 32.

Furthermore, in the embodiment shown in FIG. 9, a support step is performed in step S2. The support step is a step of nipping and supporting the turbo-cartridge 5 from both sides in the axial direction of the rotational shaft 4 via the unbalance detection device 6.

In step S3, a sensor installation step is performed. The sensor installment step is a step of installing the optical sensor device 9 so as to be capable of facing the sensor detection surface S having a flat shape applied with a marking. For instance, the optical sensor device 9 is installed so that the optical sensor device 9 can detect the sensor detection surface S so that the normal Sn of the sensor detection surface S having a flat shape and the normal of the optical sensor device 9 (normal of the light irradiation surface 91s of the light emission part 91 and normal of the light receiving surface 92s of the light receiving part 92) match within a possible range. By installing the optical sensor device 9 to be capable of facing the sensor detection surface S, the sensor detection surface S that rotates along with rotation of the mixed-flow turbine wheel 1 faces the optical sensor device 9 only for a period in a single rotation when passing the optical sensor device 9, and the optical sensor device 9 detects the sensor detection surface S during this facing period (passing period). At this time, a vibration sensor required to obtain the above described grinding information may be installed on the turbine-side housing member 6t or the bearing housing 52 of the turbo-cartridge 5, for instance.

In step S4, a rotation step of rotating the work target object such as the rotor 51 is executed. For instance, with the unbalance detection device 6 depicted in FIG. 1, the rotor 51 is rotated by supplying air with the blower 76 to the turbine-side housing member 6t or the compressor-side housing member 6c.

In step S5, a sensor detection step is performed. Specifically, by using the optical sensor device 9, the rotation speed (phase) of the work target object such as the rotor 51 is detected, and at the same time, the vibration signal of vibration generated due to unbalance of the work target object is detected with the vibration sensor (not depicted). Accordingly, it is possible to determine the phase of the work target object that is causing vibration on the basis of a relationship between the vibration signal and the phase upon rotation of the work target object.

In step S6, a grinding-information calculation step of calculating grinding information is executed. The grinding information is information including the optimum weight amount and the optimum position for balancing the work target object, calculated on the basis of the signal detected in the above sensor detection step (S5). In the unbalance correction work, unbalance is corrected by grinding the work target object on the basis of the grinding information.

The grinding information is calculated by using the vibration signal detected by the vibration sensor, the phase of the rotor 51, and the effect vector. The effect vector is information indicating the relationship between the mass to be ground and the corresponding magnitude of vibration, which is obtained by performing a test in advice on the same product as the turbo-cartridge 5 under the unbalance correction work. As described above, for the mixed-flow turbine wheel 1, the boss portion 23 or the back surface 24 (back plate portion) of the hub 2 is ground and thereby the ground portion (unbalance correction portion) is formed.

The mixed-flow turbine wheel 1 and the unbalance correction method thereof according to an embodiment of the present invention were described. Embodiments of the present invention were described in detail above, but the present invention is not limited thereto, and various amendments and modifications may be implemented.

While the oblique edge portion 32 of the mixed-flow turbine wheel 1 in FIGS. 4 to 6 is formed to have a linear shape in a meridional view, this is merely an illustrative example. In the embodiment depicted in FIGS. 4 to 6, the oblique edge portion 32 may be formed to have an arc shape.

DESCRIPTION OF REFERENCE NUMERALS

1 Mixed-flow turbine wheel
2 Hub
22 Circumferential surface
23 Boss portion
24 Back surface
3 Rotor blade
31 Leading edge
31c Tip-side end
31h Hub-side end
32 Oblique edge portion
32n Normal of oblique edge portion
33 First parallel edge portion
34 Trailing edge
35 Second parallel edge portion
36 Shroud-side edge portion
37 Third parallel edge portion
3s Reference rotor blade
4 Rotational shaft
4L Axis
5 Turbo-cartridge
51 Rotor
52 Bearing housing
52b Bearing
54 Compressor wheel
57 Oil supply port
6 Unbalance detection device
6c Compressor-side housing member
6t Turbine-side housing member
61 Compressor-side support mechanism
62 Turbine-side support mechanism
71 Pressing device
72 Pressing rod
73 Piston device
74 Coupling member
75 Air supply pipe
76 Blower
77 Oil supply pipe
78 Support arm
8 Vibration insulating member
9 Optical sensor device
91 Light emission part
91s Light irradiation surface
92 Light receiving part
92s Light receiving surface
S Sensor detection surface
Sn Normal of sensor detection surface
d1 Distance between axis of rotational shaft and hub-side end
d2 Distance between axis of rotational shaft and tip-side end
Rb Boss region (circumferential surface of hub)
Rc Rotor-blade region (circumferential surface of hub)
Rm Intermediate region (circumferential surface of hub)

The invention claimed is:

1. A mixed-flow turbine wheel, comprising:
a hub fixed to a rotational shaft;
a plurality of rotor blades disposed on a circumferential surface of the hub at intervals in a circumferential direction and configured such that each of the plurality of rotor blades has a leading edge which includes, in a meridional view, an oblique edge portion where a distance between the leading edge and an axis of the rotational shaft decreases from a tip side toward a hub side; and
a sensor detection surface having a flat surface and being applied with a marking which is detectable by an optical sensor device,
wherein the sensor detection surface is formed on a portion of the leading edge of a reference rotor blade being one of the plurality of rotor blades, such that, in the meridional view, a trailing-edge side angle formed between the axis of the rotational shaft and a normal of the sensor detection surface is smaller than a trailing-edge side angle formed between the axis of the rotational shaft and a normal of the oblique edge portion,
wherein the portion of the leading edge of the reference rotor blade includes, in the meridional view, a first parallel edge portion connecting to the oblique edge portion and extending in a direction parallel to the axis of the rotational shaft,
wherein the sensor detection surface is formed on the first parallel edge portion, and
wherein, in the meridional view, the first parallel edge portion on the leading edge of the reference rotor blade is formed on a position including a hub-side end of the leading edge.

2. The mixed-flow turbine wheel according to claim 1, wherein, in the meridional view, the oblique edge portion on the leading edge of the reference rotor blade is formed to have a linear shape.

3. The mixed-flow turbine wheel according to claim 1, wherein La/L is ⅓ or smaller, when defining L as a length of the leading edge of the reference rotor blade in the direction parallel to the axis of the rotational shaft and La as a length of the first parallel edge portion in the direction parallel to the axis of the rotational shaft.

4. The mixed-flow turbine wheel according to claim 1, wherein the sensor detection surface applied with the marking has a refractive index which is different from a refractive index of the portion of the leading edge of the reference rotor blade other than the sensor detection surface.

5. The mixed-flow turbine wheel according to claim 1, further comprising an unbalance correction portion comprising a cut-out portion formed on at least one of a back surface of the hub or a boss portion of the hub.

6. A turbo cartridge comprising:
a rotor comprising the mixed-flow turbine wheel according to claim 1,
a compressor wheel, and the rotational shaft; and a bearing housing accommodating a bearing which supports the rotor rotatably.

\* \* \* \* \*